United States Patent
Schweiss et al.

(10) Patent No.: US 10,388,949 B2
(45) Date of Patent: Aug. 20, 2019

(54) METHOD FOR PRODUCING COATED ACTIVE MATERIALS, CORE, BATTERY AND METHOD FOR PRODUCING BATTERIES USING THE MATERIALS

(71) Applicant: SGL CARBON SE, Wiesbaden (DE)

(72) Inventors: Ruediger-Bernd Schweiss, Meitingen (DE); Lea Schumann, Meitingen (DE); Christian Hammer, Meitingen (DE)

(73) Assignee: SGL Carbon SE, Wiesbaden (DE)

(*) Notice: Subject to any disclaimer, the term of this patent is extended or adjusted under 35 U.S.C. 154(b) by 1021 days.

(21) Appl. No.: 14/471,178

(22) Filed: Aug. 28, 2014

(65) Prior Publication Data

US 2014/0370394 A1     Dec. 18, 2014

Related U.S. Application Data

(63) Continuation of application No. PCT/EP2013/053906, filed on Feb. 27, 2013.

(30) Foreign Application Priority Data

Feb. 28, 2012 (DE) ........................ 10 2012 202 968

(51) Int. Cl.
    *H01M 4/587*     (2010.01)
    *H01M 4/62*     (2006.01)
    (Continued)

(52) U.S. Cl.
    CPC ......... *H01M 4/366* (2013.01); *H01M 4/0416* (2013.01); *H01M 4/0471* (2013.01); *H01M 4/587* (2013.01); *H01M 4/62* (2013.01); *H01M 10/052* (2013.01); *H01M 10/0565* (2013.01); *H01M 2220/20* (2013.01); *H01M 2220/30* (2013.01); *H01M 2300/0094* (2013.01)

(58) Field of Classification Search
None
See application file for complete search history.

(56) References Cited

U.S. PATENT DOCUMENTS 6,027,833 A * 2/2000 Ueda ............... H01M 4/583
    429/218.1
7,713,629 B2 * 5/2010 Schlenoff ............... B82Y 30/00
    428/421

(Continued)

FOREIGN PATENT DOCUMENTS

DE     102009033251 A1     9/2010
EP     1478038 A1     11/2004

(Continued)

OTHER PUBLICATIONS

Mijung Noh et al: "Amorphous Carbon-Coated Tin Anode Material for Lithium Secondary Battery" Chemistry of Materials, vol. 17, No. 8, Apr. 1, 2005, pp. 1926-1929, XP055012113.

(Continued)

*Primary Examiner* — Maria Laios
(74) *Attorney, Agent, or Firm* — Laurence A. Greenberg; Werner H. Stemer; Ralph E. Locher

(57) ABSTRACT

A method for producing coated active materials includes aqueously coating surfaces of the active materials and subsequently carbonizing the coated particles. A core, a battery and a method for using the materials for batteries are also provided.

14 Claims, 1 Drawing Sheet

(51) Int. Cl.
  *H01M 4/36* (2006.01)
  *H01M 4/04* (2006.01)
  *H01M 10/052* (2010.01)
  *H01M 10/0565* (2010.01)

(56) References Cited

U.S. PATENT DOCUMENTS

| | | | |
|---|---|---|---|
| 7,816,037 | B2 | 10/2010 | Ohta et al. |
| 8,568,617 | B2 | 10/2013 | Zhou et al. |
| 8,580,155 | B2 | 11/2013 | Ono et al. |
| 2002/0149656 | A1* | 10/2002 | Nohr ............ B41M 5/5218 347/95 |
| 2002/0164479 | A1* | 11/2002 | Matsubara ......... H01M 4/362 428/367 |
| 2005/0064282 | A1* | 3/2005 | Inagaki ............. H01M 4/364 429/163 |
| 2006/0134516 | A1 | 6/2006 | Im et al. |
| 2009/0136816 | A1 | 5/2009 | Kang et al. |
| 2011/0097629 | A1* | 4/2011 | Yew ................. H01M 4/134 429/231.8 |
| 2011/0133131 | A1* | 6/2011 | Zhou ................ H01M 4/485 252/502 |
| 2011/0311873 | A1 | 10/2011 | Schulz et al. |
| 2014/0234707 | A1* | 8/2014 | Muldoon ........... H01M 4/622 429/211 |

FOREIGN PATENT DOCUMENTS

| | | |
|---|---|---|
| EP | 2065340 A1 | 6/2009 |
| EP | 2309573 A1 | 4/2011 |
| EP | 2343760 A1 | 7/2011 |

OTHER PUBLICATIONS

Wang et al., "Carbon-coated natural graphite prepared by thermal vapor decomposition process, a candidate anode material for lithium-ion battery", Journal of Power Sources 93, 2001, pp. 123-129.
Zhang et al., "Electrochemical performance of pyrolytic carbon-coated natural graphite spheres", Carbon 44, 2006, pp. 2212-2218.
Yoon et al., "Surface modification of graphite by coke coating for reduction of initial irreversible capacity in lithium batteries", Journal of Power Sources 94, 2001, pp. 68-73.

* cited by examiner

METHOD FOR PRODUCING COATED ACTIVE MATERIALS, CORE, BATTERY AND METHOD FOR PRODUCING BATTERIES USING THE MATERIALS

CROSS-REFERENCE TO RELATED APPLICATION

This is a continuation, under 35 U.S.C. § 120, of copending International Application No. PCT/EP2013/053906, filed Feb. 27, 2013, which designated the United States; this application also claims the priority, under 35 U.S.C. § 119, of German Patent Application DE 10 2012 202 968.0, filed Feb. 28, 2012; the prior applications are herewith incorporated by reference in their entirety.

BACKGROUND OF THE INVENTION

Field of the Invention

The invention relates to a method for producing coated active materials, a core, a battery and a method for producing lithium-ion batteries, lithium sulfur batteries or lithium polymer batteries using the materials.

Lithium-ion batteries are energy storage systems with the highest possible energy density among chemical and electrochemical energy storage devices. Lithium-ion batteries are used primarily in the field of portable electronic devices, such as laptops or mobile telephones, and in the field of transport devices, such as bicycles or motor vehicles.

With regard to the material for the negative electrode ("anode"), graphitic or amorphous carbon, lithium titanate, or silicon, titanium or tin compounds are used, as are carbon-metal composites (C/Si, C/Cu, C/Sn, $C/SnO_2$). Graphitic carbon is distinguished by minimal changes in the volume of the host material, which are associated with the intercalation and precipitation of lithium. For example, when lithium is intercalated in graphitic carbon, a volume increase of approximately just 10% can be measured for the limit stoichiometry of $LiC_6$. By contrast, a disadvantage of graphitic carbon is its relatively low electrochemical capacitance of, theoretically, 372 mAh/g graphite, which corresponds to just one tenth of the electrochemical capacitance of 3862 mAh/g lithium that can theoretically be achieved by using lithium metal.

In a first charging cycle, irreversible capacitance is observed, which is attributable to the formation of a solid electrolyte interface (SEI). The SEI is attributable to reactions between electrolyte components (lithium salts, solvents) on the surface of the active materials. Particularly with graphitic anode materials, rapid cyclization (high C rate) can lead to expansion of the SEIs into the volume or to exfoliation of the graphitic structure and thus ultimately to a further drop in capacitance.

Therefore, alternative or improved materials have long been sought. One approach is for the active materials to be coated with amorphous carbon, thereby increasing the reversible capacitance and also potentially improving the capacity for rapid charging.

The coated active material has better cycle stability since rapid losses of capacitance due to possible damage to the lattice structure of the graphite do not occur.

With regard to the material for the positive electrode ("cathode"), lithium compounds such as lithium cobalt oxides, lithium nickel oxides, lithium manganese oxides, lithium manganese spinels, lithium vanadium oxides or lithium iron phosphates are used. Those materials are used as host lattices for lithium ions, but have only a very low conductivity. For that reason, conductive carbon black is added as an additive during production of the cathode.

Previously disclosed coating technologies use complex methods such as vapor phase deposition (Wang, et al., Journal of Power Sources 93, 2001, 123f; Zhang, et al., Carbon 44, 2006, 2212f) or coating methods using organic solvents or toxic carbon precursors such as pitch (Yoon, et al., Journal of Power Sources 94, 2001, 68) and additionally have the considerable disadvantage of it being difficult to control the thickness of coatings.

SUMMARY OF THE INVENTION

It is accordingly an object of the invention to provide a method for producing coated active materials, a core, a battery and a method for using the materials for batteries, which overcome the hereinafore-mentioned disadvantages of the heretofore-known methods and devices of this general type, which allow the thickness of coatings to be controlled in a targeted manner and which are additionally simple to carry out.

With the foregoing and other objects in view there is provided, in accordance with the invention, a method for producing coated active materials, which comprises aqueously coating surfaces of the active materials and then carbonizing the coated particles.

In accordance with another mode of the invention, the coated active materials (for example for anodes) are preferably carbon particles, carbon-silicon multilayer particles, carbon-tin multilayer particles, carbon-tin dioxide multilayer particles, carbon-copper multilayer particles, multilayer particles of carbon and metal alloys (for example metals such as silicon, tin, titanium and cobalt, or metal oxides thereof), nanoparticles of silicon, tin, tin oxide, titanium dioxide or lithium titanates.

In accordance with a further mode of the invention, the active materials (for example for cathodes) are preferably lithium salts such as lithium iron phosphate, or lithium oxides such as lithium-manganese spinels, or mixed oxide systems of lithium plus nickel, cobalt or manganese.

In accordance with an added mode of the invention, the particles are preferably formed of amorphous carbon and/or graphite, and/or the silicon of the carbon-silicon multilayer particles is an amorphous nano-silicon, and/or the metal of the carbon-metal multilayer particles and/or carbon-metal oxide multilayer particles is an amorphous nanoscale metal such as tin, copper, titanium or cobalt, and/or the metal oxide of the carbon-metal oxide multilayer particles is an oxide of tin, iron, titanium, manganese, nickel or copper.

These electrically conductive particles preferably have a resistivity of at most $10^{-2}$ Ωcm.

In accordance with an additional mode of the invention, more preferably, the aqueous coating is substrate coating. This is preferably taken to mean the layer-by-layer method by which polyelectrolyte multilayers are produced.

In the layer-by-layer method, monomolecular layers of polyelectrolytes are applied to a substrate. The substrate has to carry a surface charge so that an oppositely charged polyelectrolyte can be attached. Through the alternate application of cationic and anionic polyelectrolyte layers, a layer system is formed which is very stable due to strong Coulomb interactions. A washing operation is necessary after each layer. This removes polyelectrolytes that have not adhered to the surface. The solutions can be applied to the substrate by spraying or spin coating; otherwise the substrate is immersed directly in the polyelectrolyte solution.

In accordance with yet another mode of the invention, the surfaces of the active materials according to the invention are preferably coated with polyelectrolytes. More preferably, the polyelectrolytes contain aliphatic and/or aromatic rings and/or heterocycles and/or carbon nanoparticles. A preferred layer sequence is, for example, graphite/b-PEI/AP/CP/AP/CP/AP . . . , etc., wherein b-PEI, as a branched polyethyleneimine, is a cationic polyelectrolyte, which is used as an anchoring layer.

AP is preferably an anionic polyelectrolyte such as polystyrene sulfonate, polyaminobenzene sulfonic acid, carboxymethyl cellulose, lignin sulfonate or sulfonated carbon nanomaterials (carbon nanotubes, graphene, carbon nanofibers).

CP is preferably a cationic polyelectrolyte such as poly (diallyl dimethyl ammonium chloride), polyvinyl pyridine, chitosan, cationic starch, poly(benzyl viologen) or cationic forms of polyaniline, poly(alkyl)pyrroles or poly(alkyl)thiophenes.

In accordance with yet a further mode of the invention, particles having a median particle diameter of from 200 nm to 150 µm, preferably of from 100 nm to 80 µm and more preferably of from 0.5 µm to 50 µm, are used.

Within the meaning of this invention, the term "median particle diameter" refers to the $d_{50}$-value. In other words, a median particle diameter of 17 µm means that 50% of all particles have a particle diameter of less than or equal to 17 µm.

In accordance with yet an added mode of the invention, use is made of particles having a BET surface area of from 0.5 to 1000 $m^2/g$, preferably of from 1 to 300 $m^2/g$ and more preferably of from 2 to 100 $m^2/g$.

In accordance with yet an additional mode of the invention, the coated particles are fed to a graphite crucible for carbonization either in batches or continuously.

Carbonization preferably takes place at from 400° C. to 3000° C., more preferably at 900° C. In the method according to the invention, inert gases such as helium, neon, hydrogen, nitrogen or argon and more preferably argon are used in this process.

During carbonization, the polyelectrolyte multilayers are converted into amorphous carbon. The preferred thickness of the amorphous carbon layer is from 1 nm to 1 µm, more preferably from 2 to 500 nm.

With the objects of the invention in view, there is also provided a core, comprising carbon, compounds or mixtures of carbon and metals, compounds or mixtures of carbon and metal oxides, particles of lithium salts or lithium oxides, the core being coated with multiple layers of polyelectrolytes and then carbonized.

In accordance with another feature of the invention, the core is used to produce active materials for lithium-ion batteries.

With the objects of the invention in view, there is furthermore provided a lithium-ion battery, comprising an anode and/or a cathode of the coated active material according to the invention. The lithium-ion battery preferably has an electrolyte composition formed of at least one aprotic organic solvent (dimethyl carbonate, ethylene carbonate, diethyl carbonate) as the electrolyte, and lithium hexafluorophosphate, lithium tetrafluoroborate or lithium chlorate as the supporting electrolyte.

With the objects of the invention in view, there is concomitantly provided a method for producing batteries using the coated active materials produced by the method according to the invention for lithium-ion batteries, lithium polymer batteries and lithium sulfur batteries.

The following practical examples serve to illustrate the invention. All polyelectrolytes are applied in a concentration of 5 g/L and with the addition of 5 g/L NaCl.

EXAMPLE 1

10 g graphite ($d_{50}$=17 µm, BET=2 $m^2/g$):

a) The graphite was overlaid with polyethyleneimine solution, agitated for 2 minutes, and then suction-filtered using a black-band filter and a lot of de-ionised water;

b) The graphite was then transferred into 100 ml of 5 g/L lignin sulfonate solution (LS) and again agitated for 2 minutes.

After another washing step:

c) The graphite was transferred into a poly(diallyl dimethyl ammonium chloride) solution (PDADMAC), again agitated for 2 minutes and then rewashed.

Steps b and c were repeated 6 times, resulting in the following sequence:

Graphite/b-PEI/(LS/PDADMAC)$_6$

EXAMPLE 2

50 g graphite ($d_{50}$=17 µm, BET=2 $m^2/g$):

a) The graphite was overlaid with polyethyleneimine solution, agitated for 2 minutes, and then suction-filtered using a black-band filter and a lot of de-ionised water;

b) The graphite was then transferred into 100 ml of 5 g/L polystyrene sulfonate solution (PSS) and again agitated for 2 minutes.

After another washing step:

c) The graphite was transferred into a poly(diallyl dimethyl ammonium chloride) solution (PDADMAC), again agitated for 2 minutes and then rewashed.

Steps b and c were repeated 6 times, resulting in the following sequence:

Graphite/b-PEI/(PSS/PDADMAC)$_6$

The two coatings were carbonized at 900° C. in a graphite crucible for 3 days. The particles were dispersed in N-methylpyrrolidone (NMP) using polyvinylidene fluoride as a binder, were applied as an electrode film to a copper foil, and T-cells were produced therefrom. Electrochemical analysis (T-cells) yields surprisingly better values for the two characteristics of efficiency and capacitance as compared with an uncoated reference substrate.

Other features which are considered as characteristic for the invention are set forth in the appended claims.

Although the invention is illustrated and described herein as embodied in a method for producing coated active materials, a core, a battery and a method for producing batteries using the materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
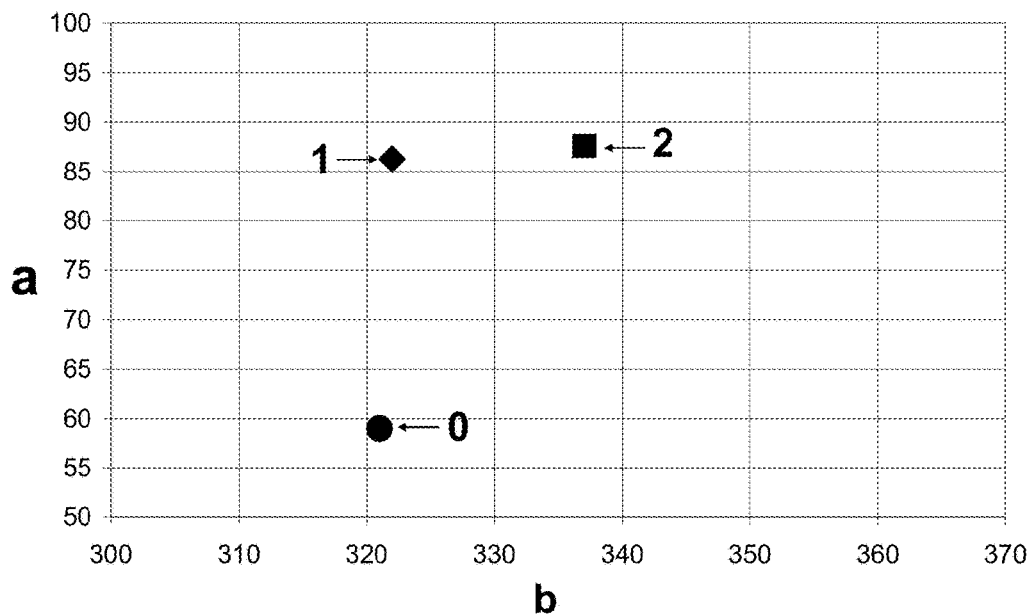
FIG. 1 is a diagram showing efficiencies of uncoated and coated substrates at different capacitances.

Referring now to the figures of the drawings in detail and first, particularly, to FIG. 1 thereof, there is seen a diagram in which efficiency a in percent is plotted against capacitance b in mAh/g. It is seen that the efficiency 0 of an uncoated reference substrate is below 60% at a capacitance of 320 mAh/g, whereas the coated substrate of example 1 achieves an efficiency 1 of over 85%. The coated substrate of example 2 even achieves an efficiency 2 of close to 90% at a capacitance of 340 mAh/g. It was thus possible to demonstrate that the coated substrates according to the invention considerably increase the reversible capacitance, thereby also improving the capacity for rapid charging.

Figure 2:
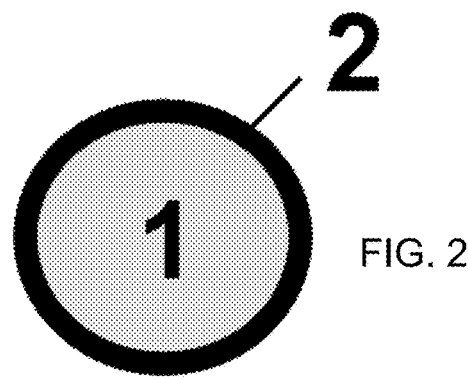
FIG. 2 is a diagrammatic, cross-sectional view of an example of a coated particle.

FIG. 2 depicts an example of a particle according to the invention, in which reference sign 1 denotes a core and reference sign 2 denotes a coating.

The invention claimed is:

1. A coated core, comprising:
    a core material selected from the group consisting of carbon, compounds of carbon and metals, mixtures of carbon and metals, compounds of carbon and metal oxides, mixtures of carbon and metal oxides, particles of lithium salts or lithium oxides, and nanoparticles of silicon, tin, tin oxide, tin dioxide, titanium dioxide and lithium titanates; and
    a coating layer of amorphous carbon having a thickness of 2 nm to 500 nm;
    said coated core having characteristics of having been obtained by:
        applying a polyelectrolyte multilayer alternately including anionic and cationic polyelectrolyte layers to said core material so as to obtain a core material including multiple layers of polyelectrolytes; and
        carbonizing said core material including said multiple layers of polyelectrolytes.

2. The core according to claim 1, wherein said core material is a lithium-ion battery active material.

3. The coated core according to claim 1, wherein said coated core material is selected from the group consisting of carbon particles, carbon-silicon multilayer particles, carbon-tin multilayer particles, carbon-tin dioxide multilayer particles, carbon-copper multilayer particles, multilayer particles of carbon and metal alloys, nanoparticles of silicon, tin, tin dioxide, titanium dioxide and lithium titanates.

4. The coated core according to claim 1, wherein said lithium salts or lithium oxides are selected from the group consisting of lithium iron phosphate or lithium oxides including lithium-manganese spinels or mixed oxide systems of lithium plus nickel, cobalt or manganese.

5. The coated core according to claim 3, wherein at least one of:
    said carbon particles are amorphous carbon and/or graphite particles,
    said silicon of the carbon-silicon multilayer particles is an amorphous nano-silicon,
    said metal of at least one of said carbon-metal multilayer particles or said carbon-metal oxide multilayer particles is an amorphous nanoscale metal including tin, copper, titanium or cobalt, or
    said metal oxide of said carbon-metal oxide multilayer particles is an oxide of tin, iron, titanium, manganese, nickel or copper.

6. The coated core according to claim 1, wherein said coating is an aqueous substrate coating.

7. The coated core according to claim 1, wherein said polyelectrolytes contain at least one of aliphatic or aromatic rings, heterocycles or carbon nanomaterials.

8. The coated core according to claim 1, wherein said particles have a median particle diameter of from 200 nm to 150 μm.

9. The coated core according to claim 1, wherein said particles have a median particle diameter of from 100 nm to 80 μm.

10. The coated core according to claim 1, wherein said particles have a median particle diameter of from 0.5 μm to 50 μm.

11. The coated core according to claim 1, wherein said particles have a BET surface area of from 0.5 to 1000 $m^2/g$.

12. The coated core according to claim 1, wherein said particles have a BET surface area of from 1 to 300 $m^2/g$.

13. The coated core according to claim 1, wherein said particles have a BET surface area of from 2 to 100 $m^2/g$.

14. A method of producing a coated core, the method comprising the following steps:
    providing a core material selected from the group consisting of carbon, compounds of carbon and metals, mixtures of carbon and metals, compounds of carbon and metal oxides, mixtures of carbon and metal oxides, particles of lithium salts or lithium oxides, and nanoparticles of silicon, tin, tin oxide, tin dioxide, titanium dioxide and lithium titanates;
    providing a coating layer of amorphous carbon having a thickness of 2 nm to 500 nm;
    applying a polyelectrolyte multilayer alternately including anionic and cationic polyelectrolyte layers to the core material so as to obtain a core material including multiple layers of polyelectrolytes; and
    carbonizing the core material including the multiple layers of polyelectrolytes.

\* \* \* \* \*